United States Patent

Steinhardt

[11] Patent Number: 5,887,613
[45] Date of Patent: Mar. 30, 1999

[54] DEVICE FOR THE REGULATION OF A CONSTANT OUTFLOW FROM A LIQUID CONTAINER

[76] Inventor: Lothar Steinhardt, Kehlweg 19, D-65239 Hochheim, Germany

[21] Appl. No.: 540,062

[22] Filed: Oct. 6, 1995

[30] Foreign Application Priority Data

Oct. 11, 1994 [DE] Germany .................. 44 36 230.7

[51] Int. Cl.⁶ .................................................. F16K 31/12
[52] U.S. Cl. .................... 137/395; 137/396; 137/414
[58] Field of Search ........................ 137/188, 192, 137/393, 395, 396, 397, 398, 399, 414, 428, 429, 430, 433, 446

[56] References Cited

U.S. PATENT DOCUMENTS

| | | | |
|---|---|---|---|
| 313,080 | 3/1885 | Kaiser | 137/396 |
| 1,676,084 | 7/1928 | Flagg | 137/414 |
| 1,839,144 | 12/1931 | Flagg | 137/414 |
| 1,969,964 | 8/1934 | Brown | 137/429 |
| 2,062,390 | 12/1936 | Brown | 137/429 |
| 2,150,359 | 3/1939 | Brown | 137/429 |
| 2,339,469 | 1/1944 | Emanuel | 137/414 |
| 2,393,119 | 1/1946 | Paasche | 137/395 |
| 2,422,352 | 6/1947 | Harper | 137/395 |
| 2,646,060 | 7/1953 | Ponsar | 137/433 |
| 3,101,770 | 8/1963 | Vant | 137/395 |
| 3,381,706 | 5/1968 | Hendey | 137/429 |
| 4,030,516 | 6/1977 | Föller | 137/399 |
| 4,372,340 | 2/1983 | Rothrock | 137/395 |
| 4,545,403 | 10/1985 | Vischer et al. | 137/395 |
| 4,582,083 | 4/1986 | Steinhardt | 137/398 |

FOREIGN PATENT DOCUMENTS

| | | | |
|---|---|---|---|
| 1236845 | 6/1960 | France | 137/395 |
| 0525825 | 11/1976 | Russian Federation | 137/395 |
| 0911480 | 3/1982 | Russian Federation | 137/395 |
| 0926624 | 5/1982 | Russian Federation | 137/395 |
| 01068902 | 1/1984 | Russian Federation | 137/395 |

*Primary Examiner*—George L. Walton
*Attorney, Agent, or Firm*—Max Fogiel

[57] ABSTRACT

The invention concerns a device for the regulation of a constant outflow from a liquid container, in particular from a rain reservoir, with an outflow opening for the liquid, wherein to the outflow opening is assigned a movable throttle element, which in dependence on the liquid level regulates the outflow of the liquid from the container.

According to the invention, it is proposed that a component part (2) that is form-changeable in dependence on the fluid pressure control the throttle element, wherein takes place the stopping-down movement of the throttle element against a restoring force (spring 5).

A device of this sort makes possible a regulation of a constant outflow from a fluid container, without requiring for this the use of a float.

22 Claims, 7 Drawing Sheets

DEVICE FOR THE REGULATION OF A CONSTANT OUTFLOW FROM A LIQUID CONTAINER

BACKGROUND OF THE INVENTION

The invention concerns a device for the regulation of a constant outflow from a liquid container, in particular from a rain reservoir, with an outflow opening for the liquid, wherein to the outflow opening is assigned a movable throttle element, which in dependence on the liquid level regulates the outflow of the liquid from the container.

Devices of this sort for the regulation of a constant outflow from a liquid container are known from the state of the technology in manifold types and styles. For the most part they make use of a float that follows the liquid level and operates the throttle element by way of a rod or the like.

In order to achieve a constant outflow from a liquid container, the outflow opening must be varied in dependence on the liquid level in the liquid container. In this the hydraulic relation governs according to the following formula:

$$Q = \mu \cdot A \cdot \sqrt{(2 \cdot g \cdot H)}$$

in which the symbols represent:
Q outflow
$\mu$ flow coefficient
A passage area of the outflow opening
g acceleration of the Earth
H dammed-in height in front of the regulating element
p pressure.

It is apparent from the formula that the area A, in dependence on the dammed-in height H, must be varied in order to maintain a constant outflow.

From DE 34 18 348 A1 a device is known of the type mentioned at the beginning that exhibits a regulator chamber with an inlet opening, with a first throttle element assigned to this, and also with an outflow opening, with a second throttle element assigned to this; in which device the two throttle elements are linked to each other so as to be fixed as regards rotation and are driven by a common float arranged in the regulator chamber. This sort of design of the device permits blockages in the region of the inlet opening of the regulator chamber to clear automatically.

Known from DE 39 14 702 A1 is a float-actuated device for the regulation of a constant outflow from a liquid container, in which device there is likewise present a regulator chamber with inlet- and outflow openings, with throttle elements assigned to these. A float arranged in the regulator chamber controls the course of the two throttle elements via control curves. This device is also suited for clearing blockages in the region of the inlet opening to the regulator chamber automatically. In addition, the regulator chamber is formed there as a bell. The airtight closing leads, in the event of a damming-in of liquid in the regulator chamber, to a compressing of the air found there and thus to a reduction in the maximum achievable liquid level in the outflow amount regulator, which can thereby build relatively little.

The disadvantage of the float construction for the regulation of a constant outflow from a liquid container is to be seen in the tall construction and consequent high cost, and further in the circumstance that with float constructions no high damming levels can be controlled, because the regulation of the constant outflow is limited by the maximal float position.

SUMMARY OF THE INVENTION

It is the task of the present invention to produce a device for the regulation of a constant outflow from a liquid container that, in a compact design without floats, permits a regulation even in the case of high damming levels.

The task is fulfilled in a device of the type mentioned at the beginning by having a component part, whose form is changeable in dependence on the liquid pressure, determine a course for the throttle element, whereupon the stopping-down movement of the throttle element ensues.

In this, according to the invention, the change in pressure, in consequence of a changed liquid level, at a defined point in the system taking up the liquid or through which it is flowing, is used to effect a change in the form of a component part located in the liquid, whereupon this change in form, by virtue of the controlling of the throttle element via the form-changeable component part, effects a stopping down of the outflow opening. In this the form-changeable component part is positioned advantageously in the container, i.e. in the region of the upper water and thus regulates the outflow by virtue, in particular, of the liquid level present there.

The form-changeable component part can be fashioned in the most various ways. For example, an elastic component part is suitable, which is compressed in consequence of the acting liquid pressure and thereby actuates the throttle element, the elastic restoring forces producing the effect that the form-changeable component part, upon a reduced pressure, i.e. upon a lowered liquid level, again extends itself and that the throttle element stops down the outflow opening less. The form-changeable component part can also be formed as a hollow body, in particular with air located in the interior of the component part. The restoring forces can be produced from the elasticity of the component part or through an additional spring or air, which, in particular, are effective in the inside of the component part. In principle the form-changeable component part can be designed in the most various ways, for example as an elastic sphere, a balloon-like component part, a cylinder with two cylinder halves movable relative to each other and sealed off from each other, a bellows with a restoring spring, and so on.

The invention is not restricted to having the form-changeable component part be controlled only in dependence on the liquid pressure in the container. It is quite possible to use the pressure prevailing subsequent to the container for the control of the form-changeable component part. This pressure prevailing subsequent to the container can be, for example, the ambient pressure or the pressure of the lower water, i.e. the water pressure that prevails behind the outflow opening (backwater).

A special design of the invention under consideration plans a form-changeable hollow component part whose interior is linked to a pressure level different from the outer pressure level of the component part. With respect to construction, this can result, for example, from designing a line that links the interior of the form-changeable component part to the ambient pressure or to the pressure of the lower water.

A further exertion of influence on the regulation of the outflow from the liquid container can be achieved if the form-changeable component part and the throttle element, which is formed, for example, as a gate, are surrounded by a bell with an inlet opening. Between the inlet opening of the bell and the outflow opening, an axis offset can also be planned, whereby a turning around of the liquid in the bell takes place, having as a consequence a, destruction of energy. Through this, the pressure in the bell increases, and thus arises a greater force for the moving of the form-changeable component part. In order to be able to remove blockages of the inlet opening of the bell, the inlet opening should also be assigned a throttle element movable by means of the form-changeable component part. In order to be able to bring about an exact regulation of the constant outflow, the form-changeable component part should control the throttle element or elements via a control curve/control disc. A bell, by the way, makes possible the installation of the regulation device also outside of the liquid container, for example in a after shaft or as an intermediate component part in pressure lines ("dry installation" and "underwater arrangement" respectively).

With very small outflows, the throttle elements must already in the starting position, without a damming-in of the inlet- or outflow openings, stop down both of these somewhat, in order not to get an excessive outflow at an incipient damming-in. As an additional installation for small outflows, a drive should be designed that makes possible the shifting of the base of the form-changeable component part in a direction perpendicular to the liquid surface. Finally, a mechanism can be planned for the adjustment of the restoring force of the form-changeable component part.

Further features of the invention are represented in the dependent claims, in the description of the figures, and in the figures themselves, it being remarked, that all of the individual features and combinations of individual features are essential to the invention.

BRIEF DESCRIPTION OF THE DRAWINGS

FIG. 1: A longitudinal section through a rain reservoir with the device according to the invention for the regulation of the outflow.

FIG. 2: A cross section through the rain reservoir shown in FIG. 1 with regulation device.

FIG. 3: A longitudinal section according to FIG. 1, the regulation device displaying two throttle elements and a bell.

FIG. 4: A cross section through the rain reservoir shown in FIG. 3 with the regulation device.

FIG. 5: A longitudinal section according to FIG. 3, the regulation device displaying a control curve.

FIG. 6: A cross section through the rain reservoir with the regulation device according to FIG. 5.

FIG. 7: A detail representation of a mechanism for the adjustment of the spring pre-tension, with which the outflow of the regulator can be fine-adjusted.

FIG. 8: A cross section through the rain reservoir with regulation device for the illustration of an axis offset between the inlet opening and the outflow opening of the bell.

FIG. 9: A longitudinal section through the rain reservoir with regulation device for the illustration of the different opening heights of the inlet opening and the outflow opening of the bell.

FIG. 10: A cross section through the rain reservoir with regulation device with an additional moving member in the manner of a bellows for the regulation of small outflows.

FIG. 11: A cross section through the rain reservoir with regulation device, in which the additional moving member is designed as an electrical, hydraulic, or pneumatic drive unit.

FIG. 12: The detail representation of a drive unit for the fine adjustment of the outflow of the regulator.

FIG. 13: An arrangement of the regulation device with bell outside of the liquid container.

DESCRIPTION OF THE PREFERRED EMBODIMENTS

Figure 1:
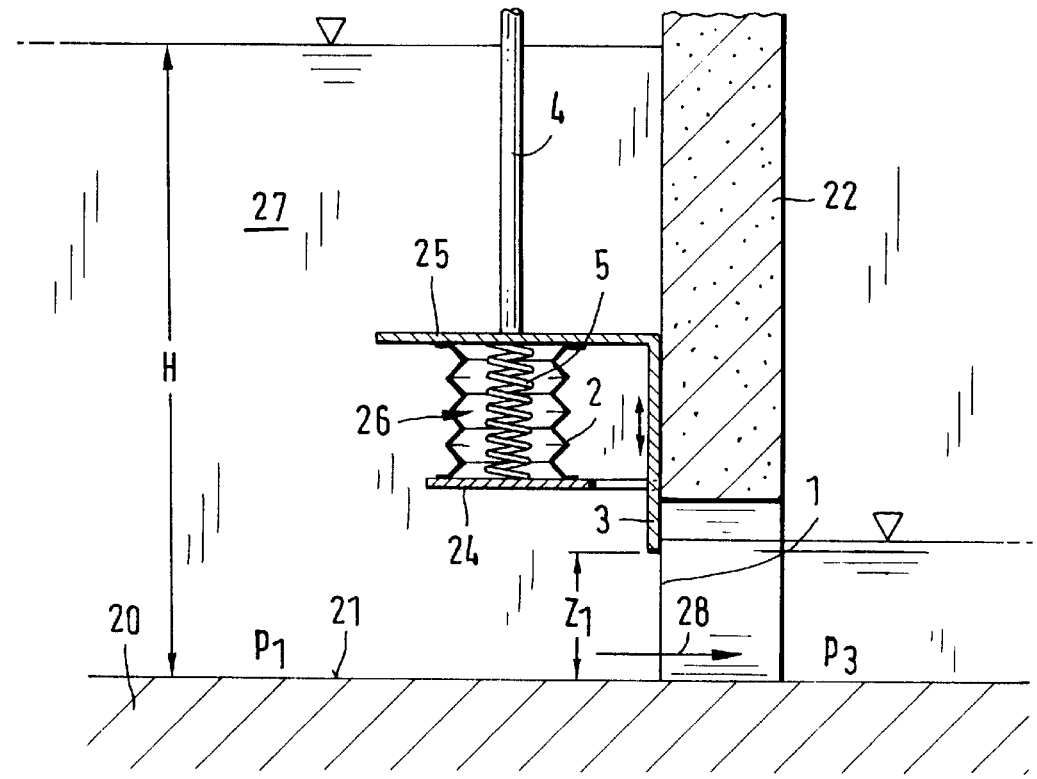
In FIGS. 1 through 13, the invention is shown in the fundamental configuration of the form-changeable component part after the manner of a bellows in many variants, without being limited to this. They show.
Figure 2:
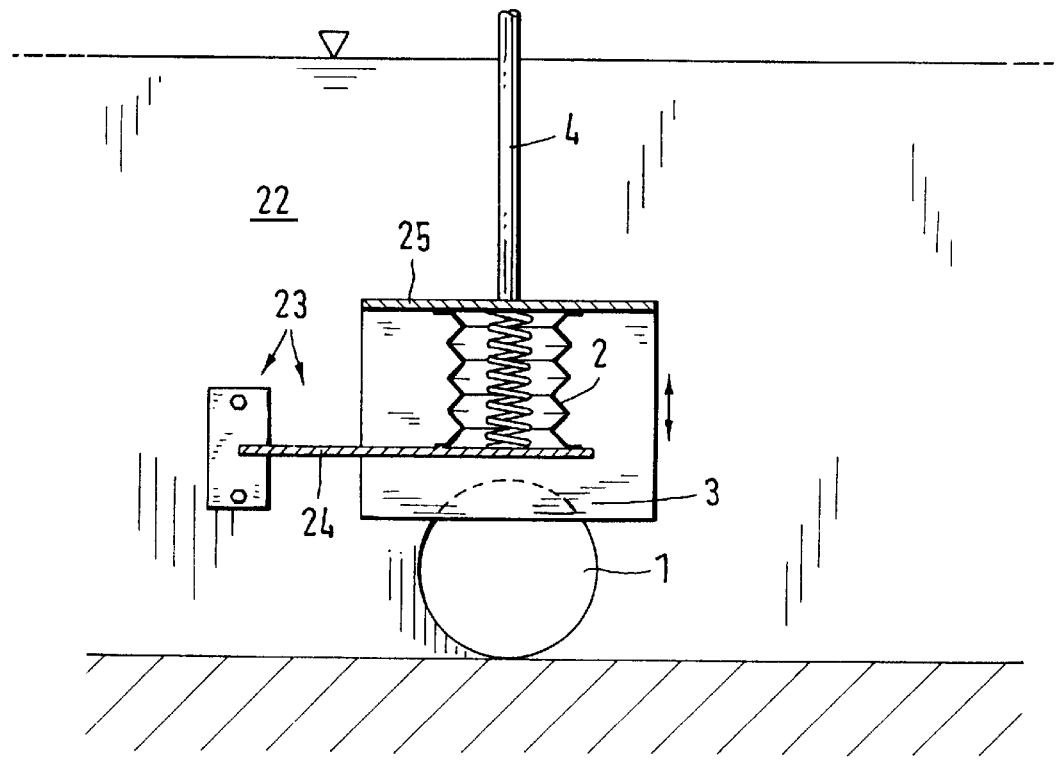

FIGS. 1 and 2 show the outflow region of the rain reservoir. Illustrated are the basin bottom 20 with the basin floor 21 and the outflow-side wall 22 with the outflow opening 1. Slightly above the outflow opening, a bracket 23 is attached to the end wall 22 inside of the reservoir. The bracket 23 displays an approximately horizontally-aligned support plate 24. Between a section of the support plate 24 and the outflow wall 22, a throttle element in the manner of a gate is led through, the plate-shaped gate body being positioned immediately next to and parallel to the end wall 22 and being vertically movable. The gate 3 shows, in the cross-sectional view of the rain reservoir, a rectangular surface. The upper region of the gate 3 is provided with a plate-shaped support extension 25, which extends above and parallel to the support plate 24 of the bracket 23. Between the support plate 24 and the support extension 25, a bellows 2 is arranged that in the regions of its two end surfaces is joined to the support plate 24 and to the support extension 25 respectively, in a manner not further illustrated. The bellows 2 encloses an interior 26, in which a spiral-shaped pressure spring is arranged, which rests against the support plate 24 and the support extension 25 and thus strives to press these apart. In the interior 25 of the bellows 2, the ambient pressure $P_u$ prevails. This is achieved by means of a ventilation line 4, which is connected at one end to the interior 26 of the bellows 2 and whose other end runs above the maximum liquid level of the upper water, i.e. of the water to be found in the rain reservoir 27.

Also shown clearly in FIG. 1 are the dammed-in height H in front of the gate 3, the upper water pressure $p_1$, the free opening height $Z_1$ of the outflow opening 1, and the water pressure $p_3$ of the lower water, as well as the fluid levels of the upper water and the lower water at some point in time. The flow direction of the water is illustrated by means of the arrow 28.

A regulation of the outflow, in accordance with the equation mentioned at the beginning, comes about in a simple manner when the bellows 2, by which is also meant in the broadest sense a compensator, a spiral tube, or the like, is compressed upon a rise in the upper water level and therewith of the upper water pressure $p_1$, and the gate 3 is moved downward. The air in the bellows 2 is in the course of this emitted via the ventilation line 4 into the surrounding air. Upon a falling upper water pressure $p_1$, the gate is again moved upward, either through the inherent spring force of is the bellows 2 or, referring to the present design example, through the pressure spring 5, whereby the gate 3 is raised again and the passage area A of the outflow opening 1 is enlarged.

The component parts shown in the variants according to FIGS. 3 through 12, corresponding to the component parts of the variant according to FIGS. 1 and 2, are marked, for the sake of simplicity, with the same reference numerals.

Figure 3:
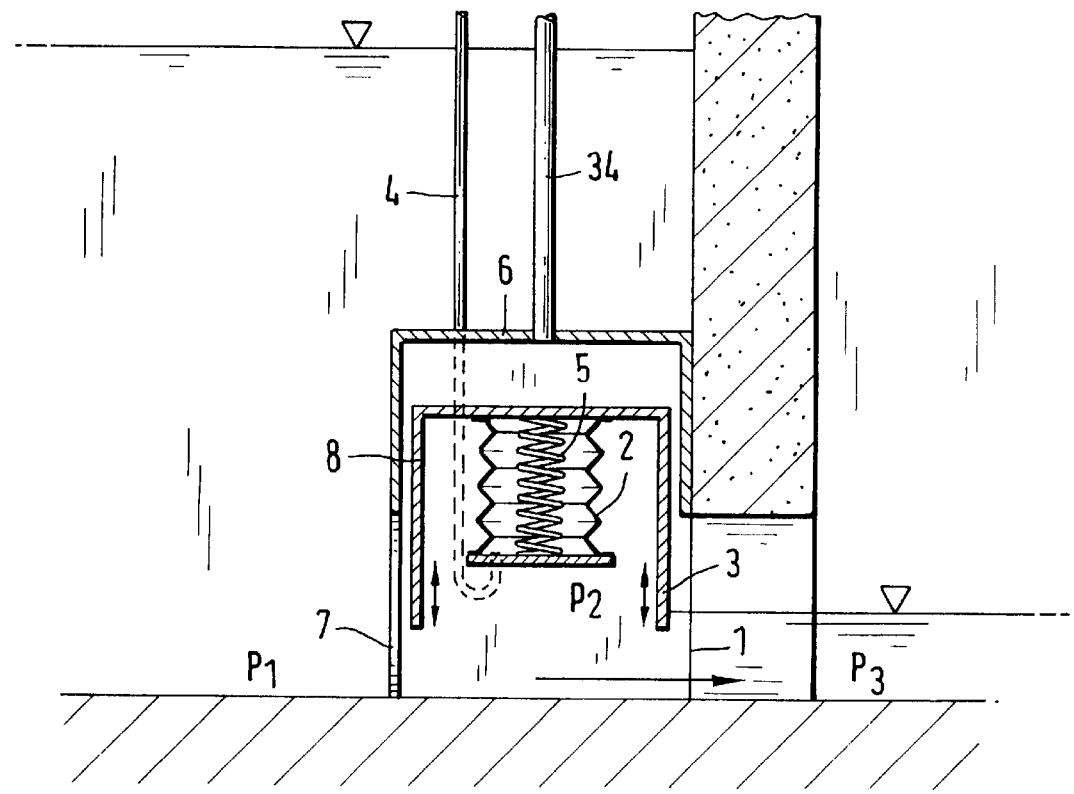
Figure 4:
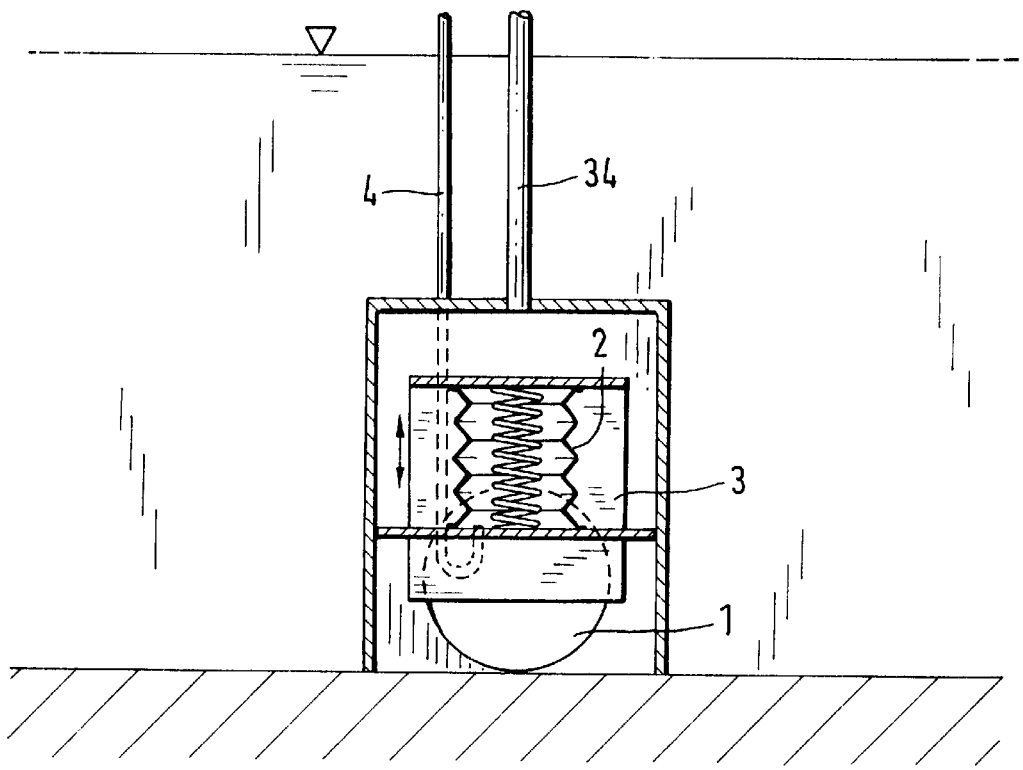

FIGS. 3 and 4 show a variant that makes it possible to remove a blockage of the outflow opening of the regulation device. This is achieved by mounting the structure illustrated in FIGS. 1 and 2 under a bell 6, and by positioning an additional throttle element in the manner of a gate 8 at the inlet opening 7 with the free opening height $Z_7$ of the bell 6. This gate 8 is rigidly connected to the outflow gate 3. When the upper water level rises, there appears inside the bell 6 a pressure $p_2$ that is equal to approximately one-half of the upper water pressure $p_1$. The bellows 2 is compressed by the pressure $p_2$ and the gates 3 and 8 are moved downward.

Now if a blockage takes place, it will appear at the gate 8, since this gate represents the first cross-sectional narrowing on the regulation device. Through the diminished inlet the bell 6 depletes itself via the outflow opening 1. The pressure $p_2$ becomes approximately equal to the pressure $p_3$, whereby the bellows 2 expands to its original length. The gates 3 and 8 are lifted and the blockage is flushed out. After that, there again appears in the bell 6 a pressure of about half of that of the upper water $p_1$, thus $p_2$. The regulator again goes into the regulation position. In the design form according to FIGS. 3 and 4 with the bell 6, in addition to the ventilation line 4 of the bellows 2 there is designed a ventilation line 34 connected to the bell 6. In consequence of the venting of the bell 6, the flow through the regulator is diminished by means of eddy processes. Through this means it is possible to open up a large aperture with equal flow-through, thereby reducing the danger of blockages.

Figure 5:
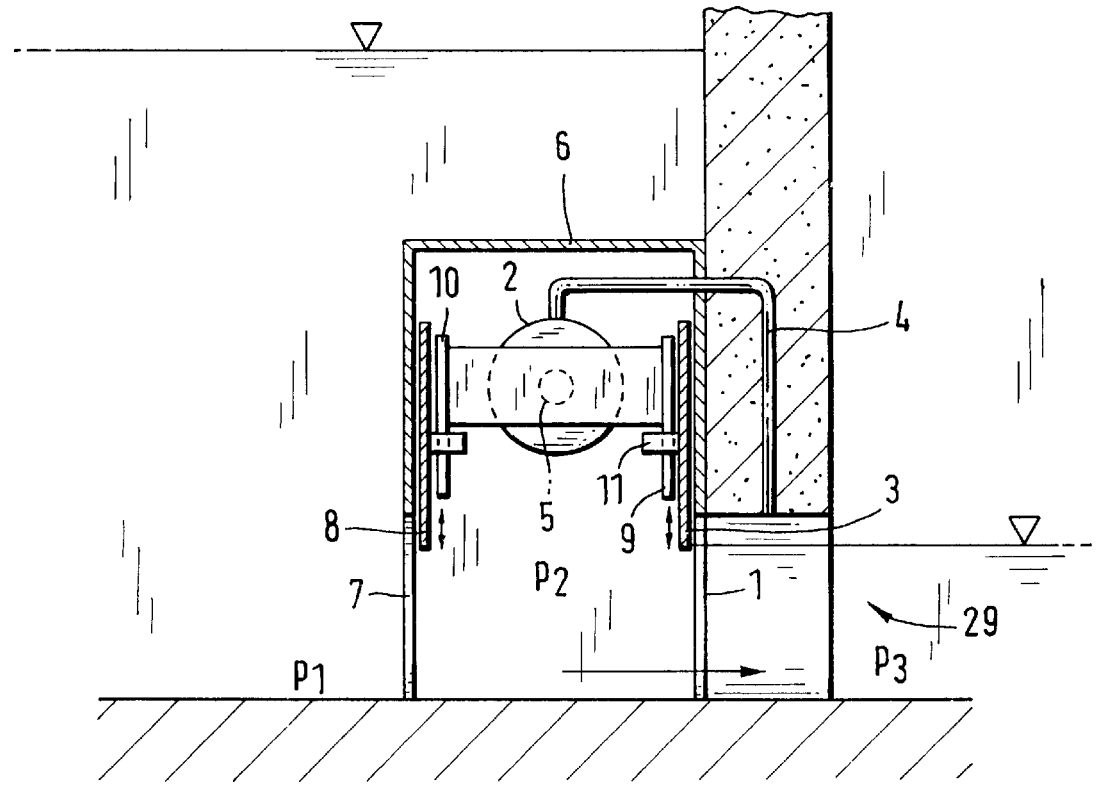
Figure 6:
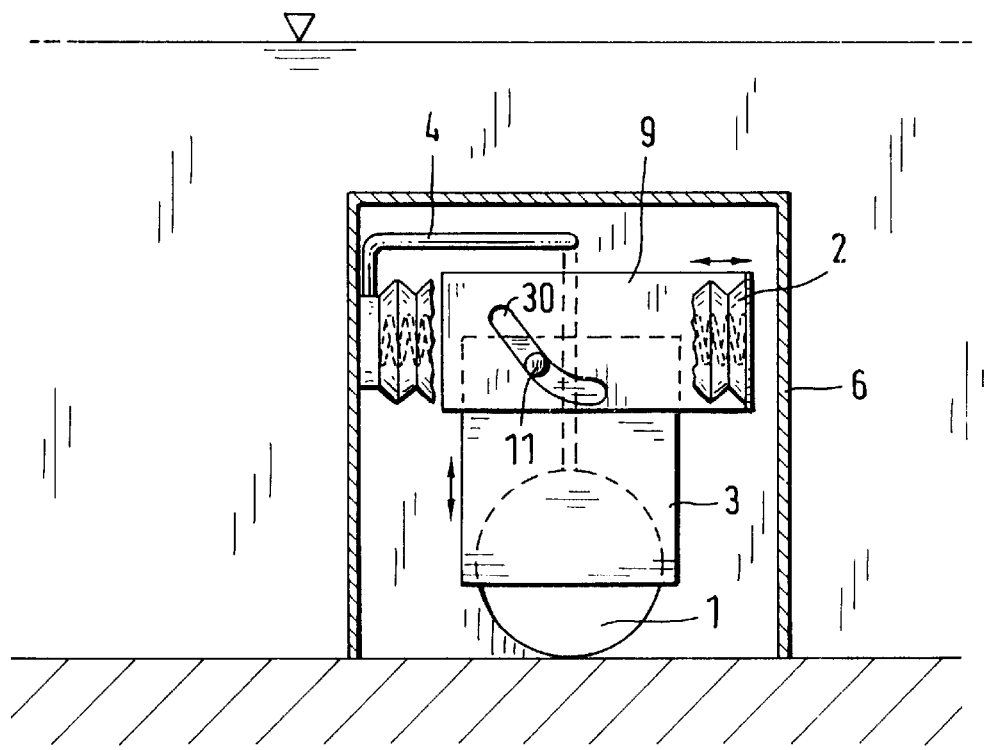

It is clear from the equation given at the beginning that, for example, upon a doubling of the water level, the outflow area in each case should be reduced only by a factor of 0.71, not 0.5, if the outflow Q is to remain constant. This root function is only poorly realizable in a technical application with the constructions described in FIGS. 1 through 4, because the spring rates of a bellows or else of an supplementary spring are as a rule approximately linear. A design of the device according to the invention that takes into consideration the root function in regulating outflow is illustrated in FIGS. 5 and 6. There the bellows 2 is arranged horizontally and provided with the pressure spring 5 inside. The ventilation line 4 of the bellows interior 26 comes out in the discharging channel 29. The bellows 2 is located under the bell 6. Upon compression of the bellows 2, two control discs 9 and 10 are shifted horizontally. Milled into these control discs is in each case a guide groove 30, which carries over the linear movement of the bellows 2 to a root-function movement of the vertically-movable supported gates 3 and 8. The transferring of the movement to the gates comes about, for example, through rollers 11 that are attached to the gates 3 and 8.

Essential to the variant illustrated in FIGS. 5 and 6 is that in the event of a backing up into the ventilation line 4 of the bellows 2, i.e. with a pressure relation $p_3 > p_u$, the bellows, corresponding to the backing up, is pressed apart. Regulation thus ensues according to the pressure difference between the upper water $p_1$ and the lower water $p_3$ with a constant outflow. This means that a regulator conceived in this way reacts even to backups and automatically regulates in correspondence to the pressure difference.

The regulation device illustrated in FIGS. 5 and 6 ensures a constant outflow no matter how high the water climbs. In this, the outflow is changeable through the insertion of various control discs 9 and 10. A self-actuated opening takes place upon blockages, as well as automatic recognition of backups and appropriate proportional regulation. The regulation device is constructed in a very compact manner and can be installed alternatively either in front of or behind the wall opening.

Figure 7:
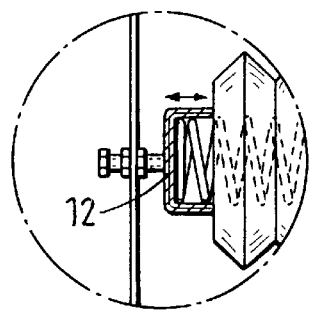

FIG. 7 shows a mechanism 12 for the adjustment of the pre-tension of the pressure spring 5 of the bellows 2. Through this adjustment of the spring pre-tension, the outflow of the regulator can be fine-adjusted.

Figure 8:
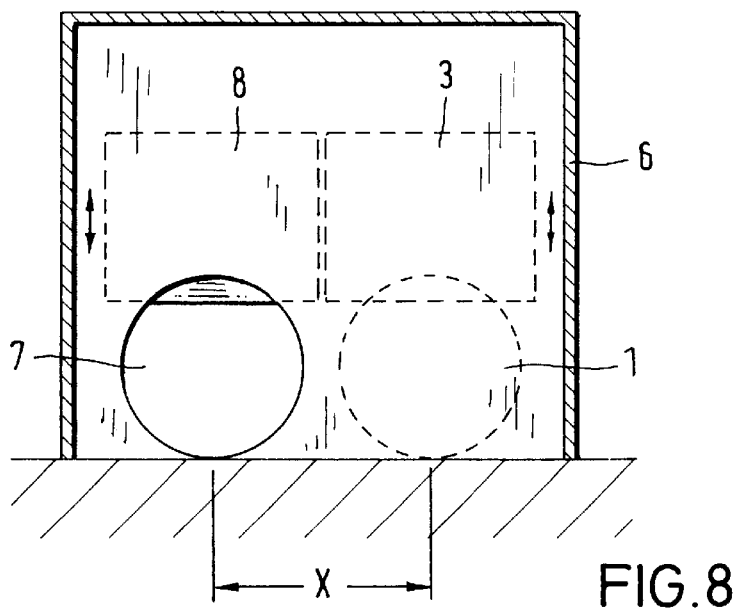
Figure 9:
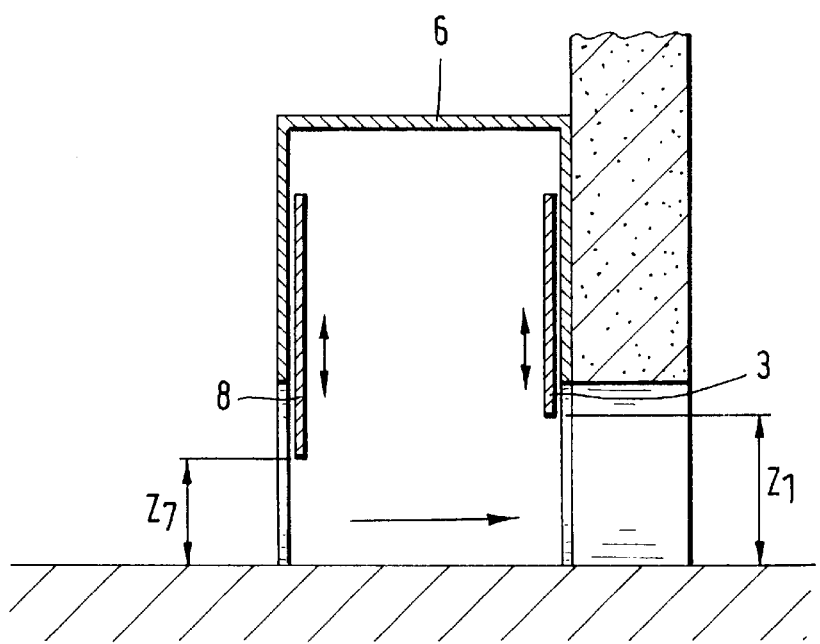
Figure 10:
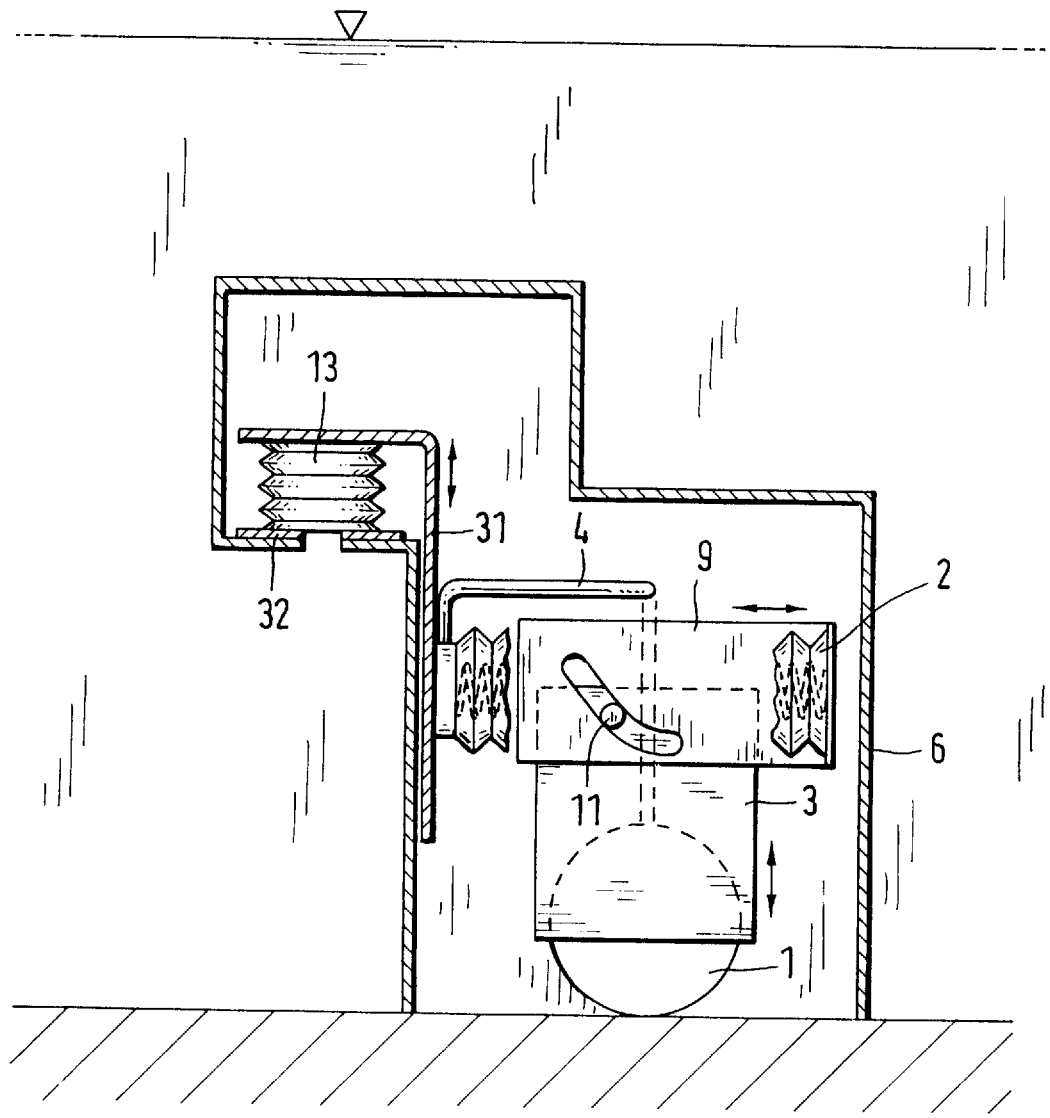

FIG. 8 shows an axis offset between the inlet opening 7 of the bell 6 and the outflow opening 1, with the dimension X. By means of this there takes place in the bell 6 a circulation of the water, which has as a consequence an energy destruction. Through this the pressure $p_2$ in the bell 6 increases to above half of the upper water pressure $p_1$. Thus there is produced a pressure $p_2$ for the moving of the bellows 2 that is greater than the pressure $p_2$ that would appear there without the axis offset. The area of the inlet opening 7 should always be greater than that of the outflow opening 1. By this means, the pressure in the bell 6 is increased further with reference to the pressure that would appear with equally large inlet- and outflow openings. FIG. 9 illustrates that the maximum opening height $Z_7$ of the inlet opening 7 should always be smaller than that of the outflow opening 1, so that any possible blockage will occur at the inlet opening 7, whereupon an automatic opening will take place.

With very small outflows, the gates in the starting position already stop down somewhat the inlet- and outflow openings without a damming-in, in order not to get an excessive outflow at an incipient damming in. Upon a possible blockage, the structure illustrated in FIGS. 5 through 9 then opens likewise only to this gate starting position. As an additional device for small outflows, according to FIG. 10 a further bellows 13 or some other movement system can be incorporated into the structure described above, in order to effect a shifting of the bellows 2. This comes about, for example, by means of arranging the additional bellows 13 between a movable bracket 31, to which the bellows 2 is attached, and a stationary bracket 32, in particular a bracket attached to the end wall 22. The bellows 13 expands only when the difference in pressure between the upper water $p_1$ and the bell 6-$p_2$—exceeds a determined value. This is the case when on the upper water side a high pressure $p_1$ is present, but the bell 6 has run dry owing to a blockage ($p_3$=ca. $p_u$). In this case the bellows 13 would move and raise, additionally to the automatic opening of the bellows 2 described above, the gates 3 and 8 up to the fully open point of the openings 1 and 7.

Figure 11:
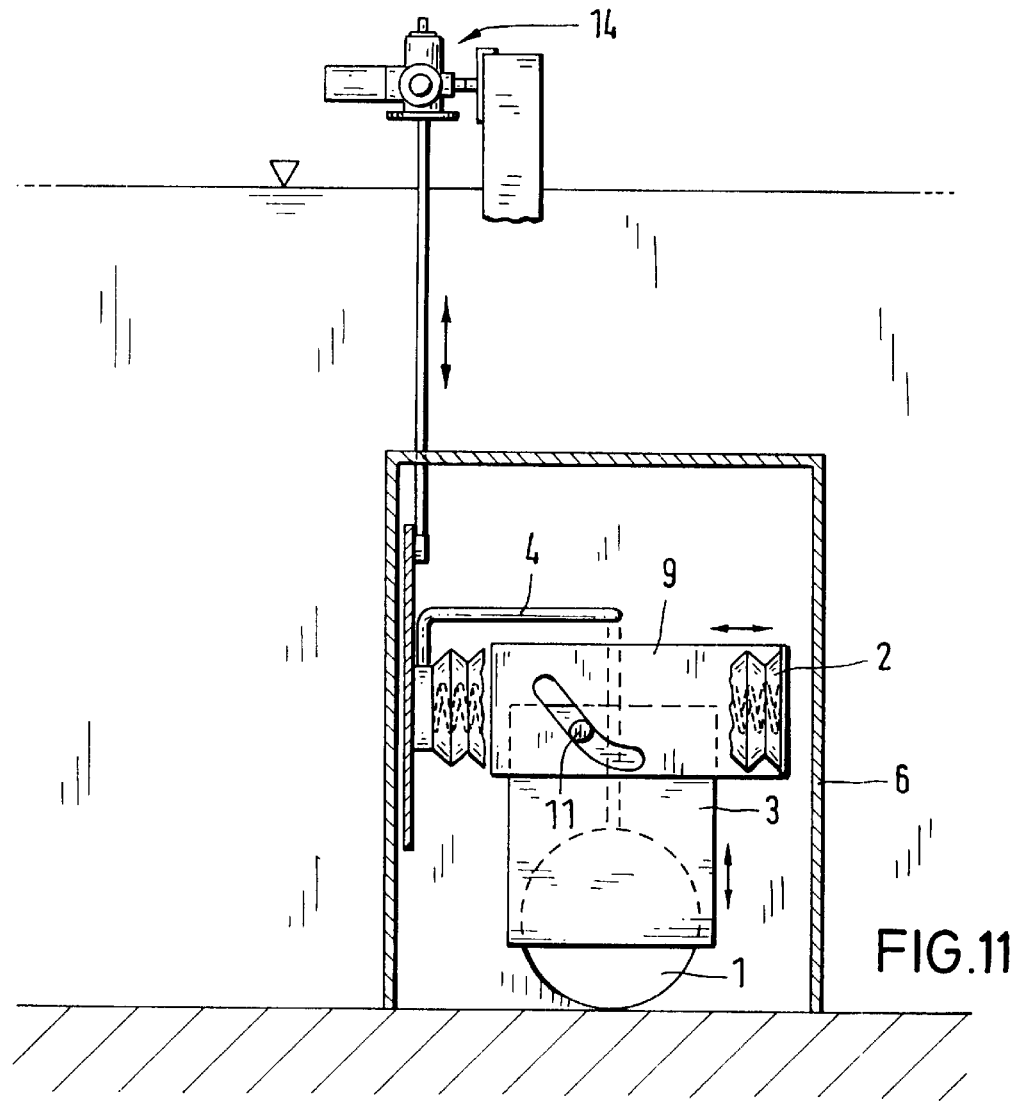
Figure 12:
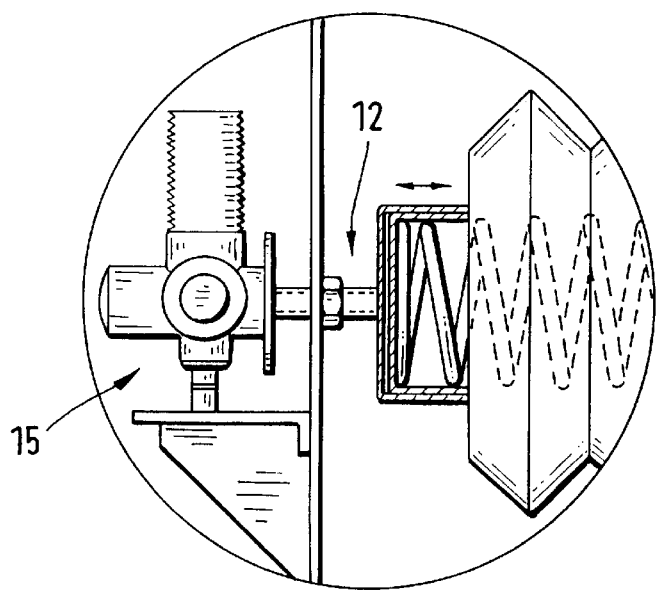

As is to be gathered from FIG. 11, in place of the additional bellows 13, an electric, hydraulic, or pneumatic drive 14 or the like can be attached, which if desired is also controllable by a remote-control system. With this, the regulator is also to operate via a remote-control system, i.e. to adjust the outflow or flush the subsequent channels. Going further, a drive unit 15, as is made clear in FIG. 12, can be attached to the adjustment mechanism 12, permitting the outflow of the regulator to be adjusted via a remote-control system. In principle the drive units 14, 15 can also be operated manually.

Figure 13:
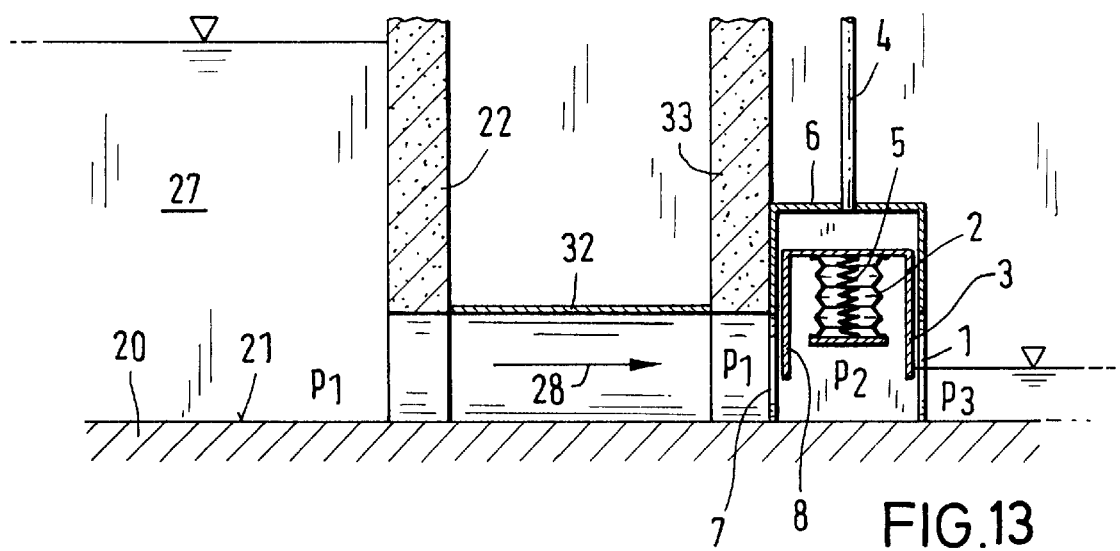

The regulation device with bell 6, designed fundamentally according to the representation in FIG. 3, is illustrated in FIG. 13, in which, however, this regulation device is attached to a further wall 33 outside the container 27. A pipe 32 connected to the outflow opening of the container 27 leads the outflowing water, under the pressure $p_1$, to the inlet opening of the regulator. In the regulator, the pressure $p_2$ appears in precisely the same manner as in the design form according to FIG. 3.

LEGENDS ON DRAWINGS

FIG. 1: Upper water
   Lower water
FIG. 2: Upper water
FIG. 3: Upper water
   Lower water
FIG. 4: Upper water
FIG. 5: Upper water
   Lower water
FIG. 6: Upper water
FIG. 10: Upper water
FIG. 11: Upper water
FIG. 13: Upper water

What is claimed is:

1. An arrangement for regulating outflow of liquid from a container in form of a rain reservoir, comprising: a reservoir wall with an outflow opening having an area; a movable throttle element movable over said opening to vary the area of said opening for regulating the outflow of liquid through said opening and from said reservoir; a form-changeable member connected to said movable throttle element and having a form varying according to fluid pressure applied to said member by the liquid; variation in said form of said member varying the position of said movable throttle element and varying thereby said area of said opening; means for restoring said throttle element to an initial position after having been moved to vary said area of said opening for regulating said outflow from said reservoir to be constant independent of the level of the liquid in said reservoir; said form of said form-changeable member being varied by fluid pressure inside said reservoir; said form-changeable member having a length varying perpendicular to the level of the liquid; said restoring means being a spring; said form-changeable member being a bellows; said form-changeable member having a hollow interior connected to a pressure different from the pressure outside of said member; a pipe line connecting an interior of said form-changeable member to an ambient pressure; means for supporting said form-changeable member in said reservoir, said member having a movable section movable relative to said supporting means and controlling movement of said throttle element; said supporting means being a bracket in said reservoir; drive means for moving said bracket perpendicular to the level of the liquid; said throttle element being a gate; bell-shaped means with an inlet opening for enclosing said form-changeable member and said gate; said inlet opening having an axis offset to said outflow opening; an additional throttle element adjacent to said inlet opening and movable by said form-changeable member; said form-changeable member controlling at least one of said throttle elements; means with a control curve between said form-changeable member and said at least one of said throttle elements; and means for adjusting a force of said restoring means.

2. An arrangement for regulating outflow of liquid from a container in form of an open system rain reservoir, comprising: a reservoir wall with an outflow opening having an area; a non-closing movable throttle element movable over said opening to vary the area of said opening for regulating the outflow of liquid through said opening and from said reservoir; a form-changeable member within the liquid connected to said movable throttle element and having a form varying according to fluid pressure due to the liquid height in the reservoir and applied to said member by the liquid; variation in said form of said member varying the position of said movable throttle element and varying thereby said area of said opening; means for restoring said throttle element to an initial position after having been moved to vary said area of said opening for regulating said outflow from said reservoir to be constant independent of the level of the liquid in said reservoir.

3. An arrangement as defined in claim 2, wherein said form of said form-changeable member is varied by fluid pressure inside said reservoir.

4. An arrangement as defined in claim 2, wherein said form of said form-changeable member is varied by fluid pressure on outside of said reservoir.

5. An arrangement as defined in claim 2, wherein said form of said form-changeable member is varied by ambient pressure.

6. An arrangement as defined in claim 2, wherein said form-changeable member has a length varying perpendicular to the level of the liquid.

7. An arrangement as defined in claim 2, wherein said restoring means is a spring.

8. An arrangement as defined in claim 2, wherein said form-changeable member is a bellows.

9. An arrangement as defined in claim 2, wherein said form-changeable member is a cylinder.

10. An arrangement as defined in claim 2, wherein said form-changeable member has a hollow interior connected to a pressure different from the pressure outside of said member.

11. An arrangement as defined in claim 2, including a pipe line connecting an interior of said form-changeable member to an ambient pressure.

12. An arrangement as defined in claim 2, including a pipe line connecting an interior of said form-changeable member to a pressure on the outside of said reservoir.

13. An arrangement as defined in claim 2, including means for supporting said form-changeable member in said reservoir, said member having a section movable relative to said supporting means and controlling movement of said throttle element.

14. An arrangement as defined in claim 13, wherein said supporting means is a bracket in said reservoir; and drive means for moving said bracket perpendicular to the level of the liquid.

15. An arrangement as defined in claim 2, wherein said throttle element is a gate.

16. An arrangement as defined in claim 15, including bell-shaped means with an inlet opening for enclosing said form-changeable member and said gate.

17. An arrangement as defined in claim 16, wherein said inlet opening has an axis offset to said outflow opening.

18. An arrangement as defined in claim 16, including an additional throttle element adjacent to said inlet opening and movable by said form-changeable member.

19. An arrangement as defined in claim 18, wherein said form-changeable member controls at least one of said throttle elements.

20. An arrangement as defined in claim 19, including means with a control curve between said form-changeable member and said at least one of said throttle elements.

21. An arrangement as defined in claim 2, including means for adjusting a force of said restoring means.

22. An arrangement for regulating outflow of liquid from a container in form of an open system rain reservoir, comprising: a reservoir wall with an outflow opening having an area; a non-closing movable throttle element movable over said opening to vary the area of said opening for regulating the outflow of liquid through said opening and from said reservoir; a form-changeable member within the liquid connected to said movable throttle element and having a form varying according to fluid pressure due to the liquid height in the reservoir and applied to said member by the liquid; variation in said form of said member varying the position of said movable throttle element and varying thereby said area of said opening; means for restoring said throttle element to an initial position after having been moved to vary said area of said opening for regulating said outflow from said reservoir to be constant independent of the level of the liquid in said reservoir; and means with a control curve between said form-changeable member and said throttle element.

* * * * *